UNITED STATES PATENT OFFICE 2,658,068

3-(CYANOMETHYL)THIANAPHTHENE-1,1-DIOXIDE

Arthur H. Schlesinger and David T. Mowry, Dayton, Ohio, assignors to Monsanto Chemical Company, St. Louis, Mo., a corporation of Delaware No Drawing. Application September 26, 1951, Serial No. 248,463

4 Claims. (Cl. 260—332.1)

The present invention relates to heterocyclic organic compounds of sulfur.

According to the invention there is provided 3-(cyanomethyl)thianaphthene-1,1-dioxide having the formula

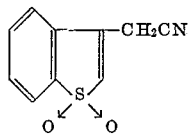

3-(cyanomethyl)thianaphthene-1,1-dioxide is readily prepared by contacting 3-(cyanomethyl)-thianaphthene with hydrogen peroxide at ordinary or increased temperatures and in the presence or absence of an inert solvent or diluent. Advantageously, reaction is effected in the presence of an unreactive solvent medium such as glacial acetic acid, dioxane, acetone, methyl ethyl ketone, etc., and temperatures of from, say 50° C. to the refluxing temperature of the reaction mixture are used. The 3-(cyanomethyl)thianapthhene is easily obtainable by reaction of 3-chloromethylthianaphthene with potassium cyanide in acetone, substantially according to the method of Blicke and Sheets (J. Amer. Chem. Soc., 70, 3768 (198)).

3-(cyanomethyl)thianaphthene-1,1-dioxide is a well-defined, high-melting crystalline compound which may be advantageously employed for a variety of industrial and agricultural purposes. It is particularly valuable as a copolymerizing monomer in the preparation of styrene copolymers.

The invention is further illustrated, but not limited, by the following example.

Example

A mixture consisting of 10.0 g. of 3-(cyanomethyl)thianaphthene, 36 ml. of 30% hydrogen peroxide and ml. of glacial acetic acid was carefully brought to a temperature of 107° C. and held at about this temperature for 20 minutes. The whole was allowed to cool, and then poured into water. After allowing the resulting mixture to stand, the solid which formed was filtered off. This was recrystallized from absolute ethanol to give pale yellow plates of the substantially pure 3-(cyanomethyl)thianaphthene-1,1-dioxide, M. P. 209.0–211.0° C. and analyzing as follows:

|  | Found | Calcd. for $C_{10}H_7O_2NS$ |
|---|---|---|
| Percent C | 58.40 | 58.5 |
| Percent H | 3.20 | 3.41 |

The 3-(cyanomethyl)thianaphthene-1,1-dioxide may be copolymerized with styrene to yield products having improved thermal stability. The copolymerization may be effected substantially according to the process employed for the preparation of copolymers from thianaphthene-1,1-dioxide and styrene, as described in the Morner and Mowry U. S. Patent No. 2,559,166. In preparing the 3-(cyanomethyl)thianaphthene-1,1-dioxide-styrene copolymers there may be employed from only 1 part to 5 parts by weight of the present dioxide with from 99 to 95 parts by weight of styrene to yield copolymers possessing improved heat distortion properties.

What we claim is:

1. 3-(cyanomethyl)thianaphthene-1,1-dioxide.

2. The process of preparing 3-(cyanomethyl)-thianaphthene-1,1-dioxide which comprises contacting 3-(cyanomethyl)thianaphthene with hydrogen peroxide and recovering said dioxide from the resulting reaction product.

3. The process of preparing 3-(cyanomethyl)-thianaphthene-1,1-dioxide which comprises contacting 3-(cyanomethyl)thianaphthene with hydrogen peroxide in the presence of an unreactive solvent, and recovering said dioxide from the resulting reaction product.

4. The process of preparing 3-(cyanomethyl)-thianaphthene-1,1-dioxide which comprises heating 3-(cyanomethyl)thianaphthene with hydrogen peroxide while dissolved in glacial acetic acid and recovering said dioxide from the resulting reaction product.

ARTHUR H. SCHLESINGER.
DAVID T. MOWRY.

References Cited in the file of this patent
Bordwell et al., J. A. C. S. 71, 1702–5 (1949).
Lanfry, Compt. Rend. 154, 519–21.